US006249431B1

(12) United States Patent
Chan

(10) Patent No.: US 6,249,431 B1
(45) Date of Patent: Jun. 19, 2001

(54) DESKTOP ITEM

(75) Inventor: Sik-Leung Chan, Tsuen Wan (HK)

(73) Assignee: C. C. & L Company Limited (HK)

(*) Notice: Subject to any disclaimer, the term of this patent is extended or adjusted under 35 U.S.C. 154(b) by 0 days.

(21) Appl. No.: 09/455,066

(22) Filed: Dec. 6, 1999

(51) Int. Cl.[7] .......................................... G06F 1/16

(52) U.S. Cl. .......................... 361/685; 361/610; 361/686; 312/332.1; 360/97.01

(58) Field of Search .................................... 361/685, 686, 361/687, 683, 610, 600, 679, 680, 681; 360/97.01, 98.01, 137, 137 D; 312/332.1, 333; 248/500

(56) References Cited

U.S. PATENT DOCUMENTS

| | | | | |
|---|---|---|---|---|
| 5,796,575 | * | 8/1998 | Podwalny et al. | 361/681 |
| 6,011,699 | * | 1/2000 | Murray et al. | 361/814 |
| 6,046,730 | * | 4/2000 | Bowen et al. | 345/168 |
| 6,073,034 | * | 6/2000 | Jacobsen et al. | 455/566 |
| 6,104,916 | * | 8/2000 | Steinhoff et al. | 455/90 |
| 6,128,186 | * | 10/2000 | Feierbach | 361/683 |

* cited by examiner

*Primary Examiner*—Leo P. Picard
*Assistant Examiner*—Hung Van Duong
(74) *Attorney, Agent, or Firm*—Samuels, Gauthier & Stevens

(57) ABSTRACT

A desktop item which comprises a body having upper and lower sides and a cover for covering the upper side. The cover is connected to the body by means of a pair of links for relative movement between a top position covering the upper body side and a bottom position lying upside-down and immediately underneath the lower body side. The desktop item includes a spring resiliently biasing the cover towards the bottom position, and a latch for holding the cover in the top position against the action of the spring. Release of the latch permits the cover to move to the bottom position under the action of the spring. The subject desktop item may be in the form of a calculator or a memo pad holder or the like.

13 Claims, 4 Drawing Sheets

DESKTOP ITEM

BACKGROUND OF THE INVENTION

Desktop items, such as calculators or memo pads, are in abundant use, which are usually left on the desktop even when they are not being used. While in this condition, the desktop item is susceptible to the accumulation of dust and, in particular, for a calculator, its display may easily be damaged by other objects hitting on it. In a known design for a calculator, it incorporates a hinged lid for the display, which is spring-loaded to flip open upon the pressing of a button. The lid only protects the display.

The invention seeks to provide an improved desktop item which is capable of solving the aforesaid problem and is fun to use.

SUMMARY OF THE INVENTION

According to the invention, there is provided a desktop item comprising a body having an upper side and a lower side, a cover for covering the upper body side, a link connecting the cover to the body for relative movement between a top position covering the upper body side and a bottom position lying upside-down and immediately underneath the lower body side, a spring resiliently biassing the cover towards the bottom position, and a locking member for holding the cover in the top position against the action of the spring and for, upon release, permitting the cover to move to the bottom position under the action of the spring.

Preferably, upon release of the locking member, the cover is pivotable upside-down off the body and subsequently the body is movable onto the cover.

It is preferred that the cover has a size sufficiently large for, in the top position, covering substantially the entire upper body side, in the bottom position, covering substantially the entire lower body side.

It is further preferred that the cover has a pair of flanges on opposite lateral sides for receiving the body in either the top or the bottom position.

Preferably, the desktop item includes a pair of said links provided on opposite lateral sides of the body and cover, wherein each link has a first end hinged to a rear end of the body and a second end hinged to a part of the cover.

More preferably, the second end of each link is hinged to a middle part of the cover.

It is preferred that the spring is in the form of a torsional coil spring provided within the rear end of the body for acting upon the first ends of the links.

More preferably, the second ends of the links are hinged to respective flanges formed on opposite lateral sides of the cover.

It is preferred that the locking member is provided at one end of one of the body and cover for engaging an adjacent end of the other of the body and cover while in the top position.

It is further preferred that the opposite ends of the body and cover are engageable with each other for co-operation with the locking member to hold the cover in the top position relative to the body.

In a first preferred embodiment, the desktop item is in the form of an electronic device having a display and associated keys which are provided on the upper body side, wherein the cover is arranged in the top position to protect the display and keypad.

In a second preferred embodiment, the desktop item is in the form of a receptacle for stationery items having an opening which is formed on the upper body side, wherein the cover is arranged in the top position to close the opening.

The invention also provides a desktop item comprising a generally flat body having an upper side and a lower side, a cover for covering the upper body side, said body and cover being connected together for relative movement between a first condition in which the cover lies immediately over the upper body side and a second condition in which the cover lies immediately underneath the lower body side, a spring resiliently biassing the body and cover towards the second condition, and a locking member for holding the body and cover in the first condition against the action of the spring, the arrangement being such that, upon release of the locking member, the cover is pivotable upside-down off the body and subsequently the body is movable onto the cover.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
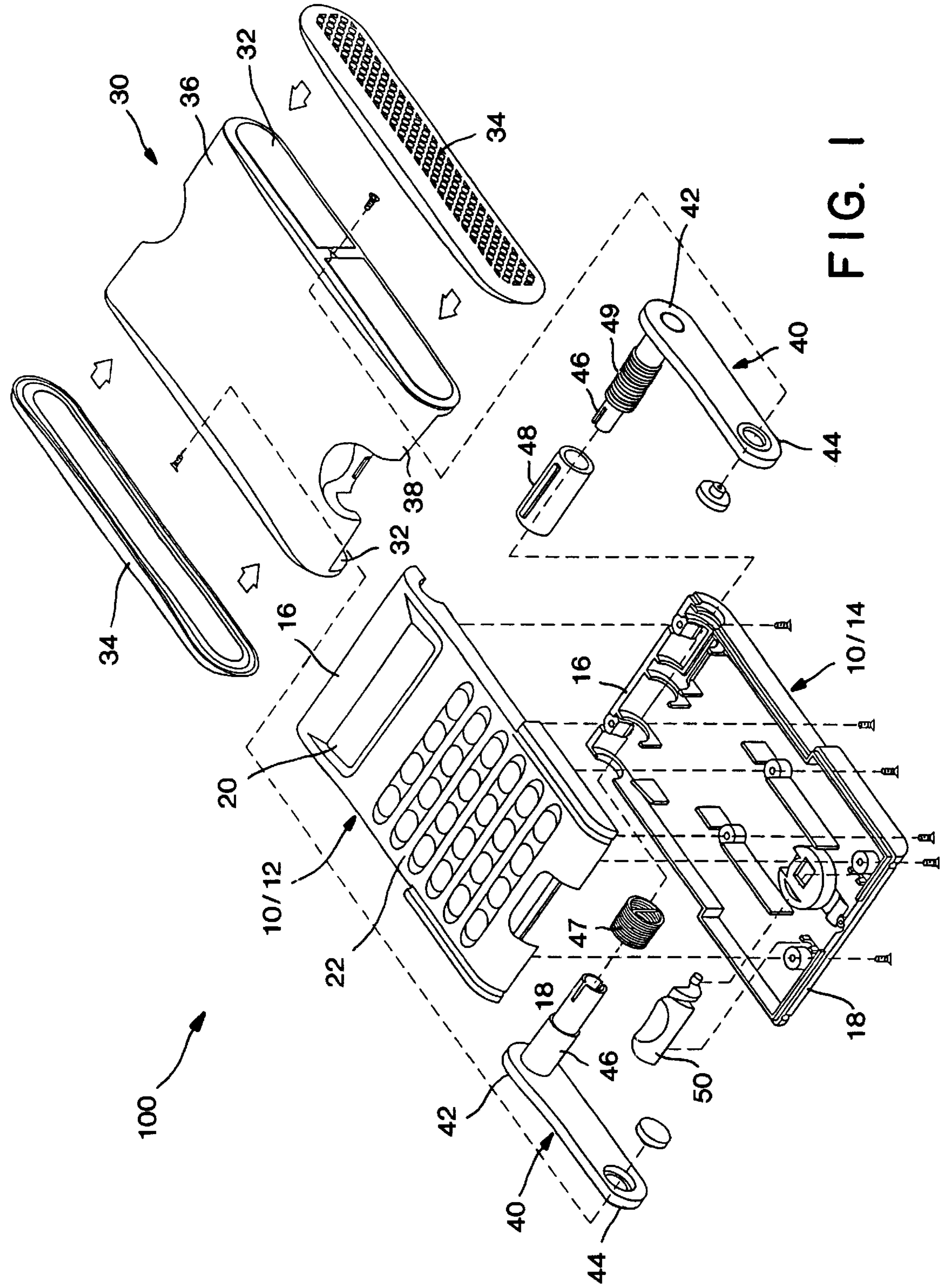
FIG. 1 is an exploded top perspective view of a first embodiment of a desktop item, in the form of a calculator, in accordance with the invention.
Figure 2:
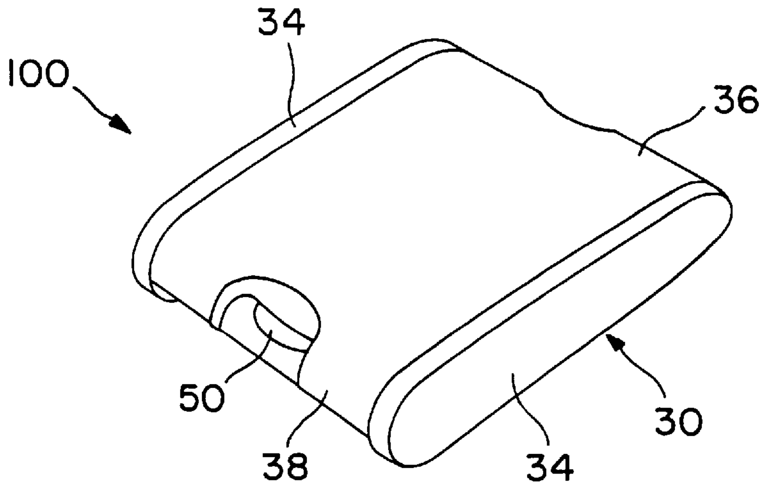
FIGS. 2 to 6 are top perspective views illustrating sequentially how the calculator of FIG. 1 is opened up for use from a closed condition.

Referring initially to FIGS. 1 to 6 of the drawings, there is shown a desktop item in the form of a calculator 100 embodying the invention, which calculator 100 has a flat plastics body 10 formed by upper and lower body parts 12 and 14, with a display 20 and an associated keypad 22 provided on the upper side of the body part 12. The calculator 100 includes a plastics cover 30 for covering the upper body part 12, thereby protecting the display 20 and keypad 22. The cover 30 has a pair of integral flanges 32 extending along its opposite lateral sides and is sufficiently large for enclosing almost the entire body 10. The flanges 32 are enclosed externally by respective elongate rubber side caps 34, which provide the cover 30 with a better frictional grip on a desktop, whether it is in the normal or an upside-down position.

The cover 30 is connected to the body 10 by means of a pair of links 40 provided on opposite lateral sides. Each link 40 has a first end 42 hinged to a far end 16 of the body 10 and a second end 44 hinged to the middle part of the respective flange 32 of the cover 30. The first ends 42 of the links 40 are inter-connected by means of respective laterally extending shafts 46 which are jointed co-axially together through the far end 16 of the body 10. A torsional coil spring 47 and a sleeve 48 are disposed on the jointed shafts 46. The spring 47 co-acts between the shafts 46 and the body 10 for resiliently biassing the links 40 to turn in direction X. The sleeve 48 is fixed with respect to the body 10 and is filled with a viscous damping fluid for slowing down the turning of the shafts 46 and hence the links 40. The second ends 44 of the links 40 are practically freely hinged to the inner sides of the respective flanges 32.

Figure 6:
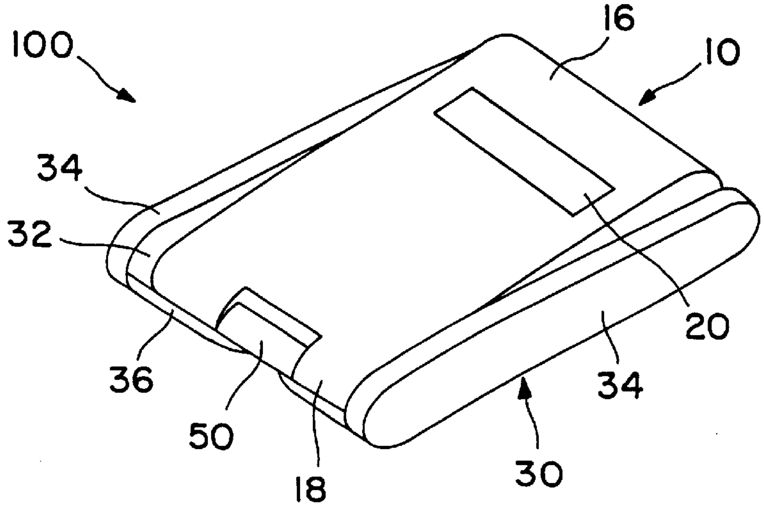

The arrangement of the links 40 enables the cover 30 and the body 10 to move relative to each other, between a first condition in which the cover 30 is in a top position lying immediately over the upper body part 12 (FIG. 2) and a second condition in which the cover 30 is in a bottom position lying immediately underneath the lower body part 14 (FIG. 6). In the top position, the cover 30 encloses almost the entire body 10 from above to protect the display 20 and keypad 22, when the calculator 100 is not in use. In the bottom position, the cover 30 is moved to below the body 10, acting as a tray receiving almost the entire body 10, for revealing the display 20 and keypad 22 for use.

The spring 47 serve, to resiliently bias the cover 30 and body 10 towards the second condition. A locking member, preferably in the form of a spring-loaded latch 50, is provided at a near end 18 of the body 10 for engaging an adjacent end 38 of the cover 30. Opposite end 36 of the cover 30 is curved slightly inwards for hooking the far end 16 of the body 10. The latch action, co-operated by the hooking action serves to hold the cover 30 in the top position on the body 10 against the action of the spring 47.

Figure 3:
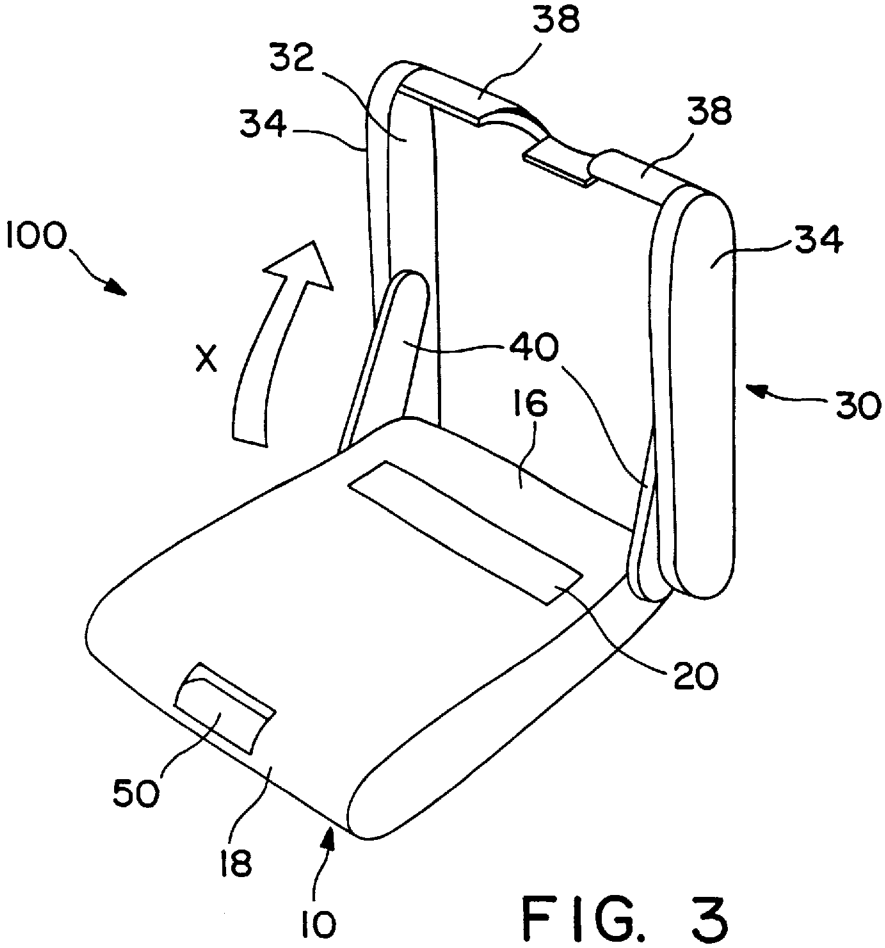
Figure 4:
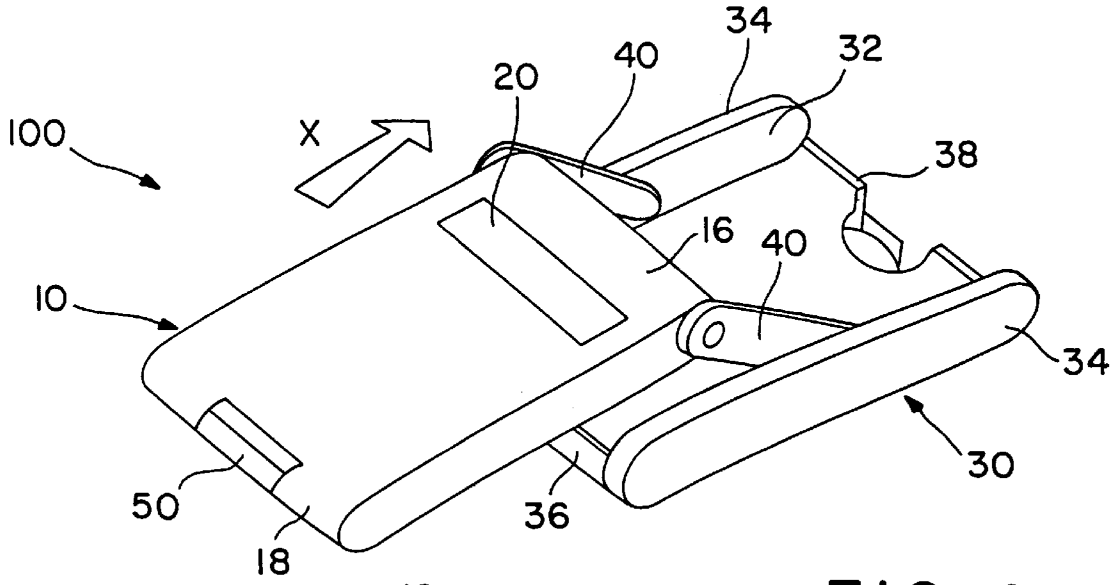
Figure 5:
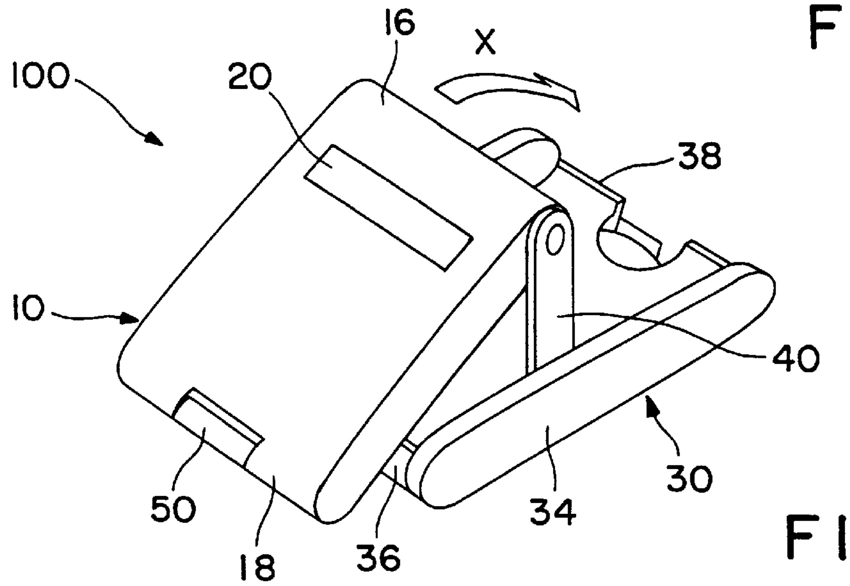

The relative movement between the cover 30 and the body 10, from the first condition (FIG. 2) to the second condition (FIG. 6), will now be described. Upon pressing of the latch 50, the cover 30 is released to immediately pivot upwards and then backwards off the body 10, by reason of the links 40 turning in direction X under the action of the spring 47 (FIG. 3). The cover 30 will stop moving when it reaches an upside-down position (FIG. 4). Whereupon, continual action of the spring 47 will cause the links 40 to turn further, thereby pulling the body 10 onto the inverted cover 30 (FIG. 5). The body 10 will finally come to a rest when it sits squarely within the inverted cover 30 (FIG. 6).

When not in use, the calculator 100 may be converted from the second condition back to the first condition through manual operation in the reversed order.

In the first condition, the calculator body 10 is fully protected by the cover 30, and the overall device does not look like a calculator. Opening up of the calculator 100 to reveal the display 20 and keypad 22, into the second condition, is in itself an interesting action.

Figure 7:
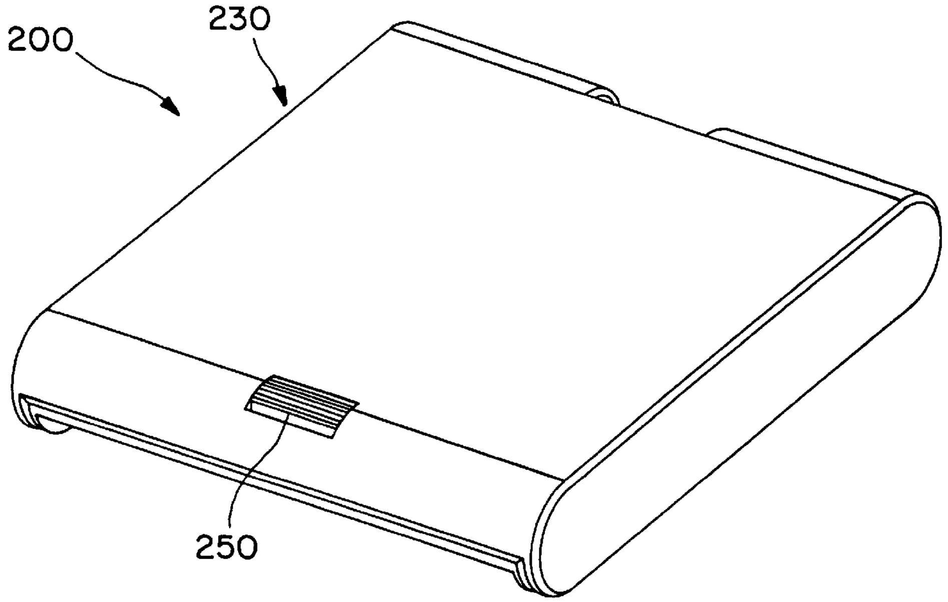
FIG. 7 is a top perspective view of a second embodiment of a desktop item, in the form of a memo pad holder, in accordance with the invention, showing the holder in a closed condition.
Figure 8:
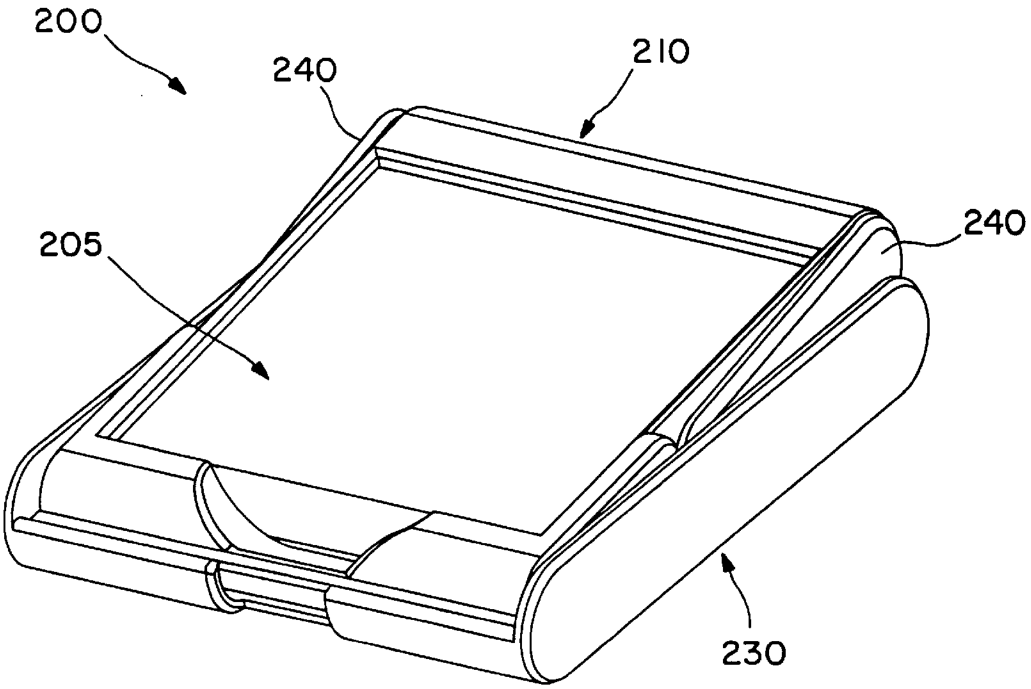
FIG. 8 is a top perspective view of the memo pad holder of FIG. 7, showing the holder in an open condition.

Referring now to FIGS. 7 and 8 of the drawings, there is shown a desktop item in the form of a memo pad holder 200 embodying the invention, which holder 200 has the same general basic construction, apart from the overall size and shape, as the aforesaid calculator 100. In order to hold a memo pad 205, the holder 200 has a plastics tray-like body 210 having an open upper side (equivalent to the aforesaid body 10 but not for holding calculator-related elements). The holder 200 includes a plastics cover 230 (equivalent to the aforesaid cover 30) for closing the open upper side of the body 210 to protect the memo pad 205.

The cover 230 is connected to the body 210 by means of a pair of spring-loaded links 240 (equivalent to the aforesaid links 10) in the same aforesaid manner, for conversion between similar closed and open conditions (FIGS. 7 and 8) in the same manner as described previously with reference to FIGS. 2 to 6. The holder 200 likewise incorporates a spring-loaded latch 250 (equivalent to the aforesaid latch 50) for holding the cover 230 in position to cover the body 210. However, in the present case, the latch 250 is provided on the cover 230 (instead of the aforesaid body 10) for engaging the body 210 (instead of the aforesaid cover 30).

It is envisaged that the subject desktop item may be a clock (an electronic device similar to the calculator 100) or a paper clip holder (a receptacle for stationery items similar to the memo pad holder 200), or in any other forms of items for use on a desktop.

The invention has been given by way of example only, and various other modifications of and/or alterations to the described embodiments may be made by persons skilled in the art without departing from the scope of the invention as specified in the appended claims.

What is claimed is:

1. A desktop item comprising a body having an upper side and a lower side, a cover for covering the upper body side, a link connecting the cover to the body for relative movement between a top position covering the upper body side and a bottom position lying upside-down and immediately underneath the lower body side, a spring resiliently biasing the cover towards the bottom position, and a locking member for holding the cover in the top position against the action of the spring and for, upon release, permitting the cover to move to the bottom position under the action of the spring.

2. The desktop item as claimed in claim 1, wherein, upon release of the locking member, the cover is pivotable upside-down off the body and subsequently the body is movable onto the cover.

3. The desktop item as claimed in claim 1 or claim 2, wherein the cover has a size sufficiently large for, in the top position, covering substantially the entire upper body side, in the bottom position, covering substantially the entire lower body side.

4. The desktop item as claimed in claim 1 or claim 2, including a pair of said links provided on opposite lateral sides of the body and cover, wherein each link has a first end hinged to a rear end of the body and a second end hinged to a part of the cover.

5. The desktop item as claimed in claim 1 or claim 2, wherein the locking member is provided at one end of one of the body and cover for engaging an adjacent end of the other of the body and cover while in the top position.

6. The desktop item as claimed in claim 1, being in the form of an electronic device having a display and associated keys which are provided on the upper body side, wherein the cover is arranged in the top position to protect the display and keypad.

7. The desktop item as claimed in claim 1, being in the form of a receptacle for stationery items having an opening which is formed on the upper body side, wherein the cover is arranged in the top position to close the opening.

8. The desktop item as claimed in claim 3, wherein the cover has a pair of flanges on opposite lateral sides for receiving the body in either the top or the bottom position.

9. The desktop item as claimed in claim 4, wherein the second end of each link is hinged to a middle part of the cover.

10. The desktop item as claimed in claim 4, wherein the spring is in the form of a torsional coil spring provided within the rear end of the body for acting upon the first ends of the links.

11. The desktop item as claimed in claim 10, wherein the second ends of the links are hinged to respective flanges formed on opposite lateral sides of the cover.

12. The desktop item as claimed in claim 5, wherein the opposite ends of the body and cover are engageable with each other for co-operation with the locking member to hold the cover in the top position relative to the body.

13. A desktop item comprising a generally flat body having an upper side and a lower side, a cover for covering the upper body side, said body and cover being connected together for relative movement between a first condition in which the cover lies immediately over the upper body side and a second condition in which the cover lies immediately underneath the lower body side, a spring resiliently biasing the body and cover towards the second condition, and a locking member for holding the body and cover in the first condition against the action of the spring, the arrangement being such that, upon release of the locking member, the cover is pivotable upside-down off the body and subsequently the body is movable onto the cover.

* * * * *